(12) United States Patent
Greivenkamp, Jr. et al.

(10) Patent No.: US 10,288,522 B2
(45) Date of Patent: May 14, 2019

(54) CHARACTERIZING THE SURFACE OF A CONTACT LENS WITH AN IMMERSED REFERENCE PRISM

(71) Applicant: Johnson & Johnson Vision Care, Inc., Jacksonville, FL (US)

(72) Inventors: John E. Greivenkamp, Jr., Tucson, AZ (US); James William Haywood, Orange Park, FL (US); Kyle C. Heideman, Hawthorne, CA (US); Russell T. Spaulding, St. Johns, FL (US); Gregory Allen Williby, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 16/144,277

(22) Filed: Sep. 27, 2018

(65) Prior Publication Data

US 2019/0025155 A1    Jan. 24, 2019

Related U.S. Application Data

(62) Division of application No. 15/952,354, filed on Apr. 13, 2018, now Pat. No. 10,145,757, which is a division of application No. 14/830,076, filed on Aug. 19, 2015, now abandoned.

(60) Provisional application No. 62/039,682, filed on Aug. 20, 2014.

(51) Int. Cl.
*G01B 9/02* (2006.01)
*G01M 11/02* (2006.01)

(52) U.S. Cl.
CPC ......... *G01M 11/025* (2013.01); *G01B 9/0209* (2013.01); *G01B 9/02038* (2013.01); *G01M 11/0214* (2013.01); *G01M 11/0271* (2013.01)

(58) Field of Classification Search
CPC .......... G01M 11/025; G01M 11/0271; G01M 11/0214; G01B 9/02038; G01B 9/0209
See application file for complete search history.

(56) References Cited

U.S. PATENT DOCUMENTS

| | | |
|---|---|---|
| 9,019,485 B2 | 4/2015 | Ignatovich et al. |
| 2004/0263783 A1 | 12/2004 | Neal et al. |
| 2007/0002331 A1 | 1/2007 | Hall |
| 2008/0180683 A1* | 7/2008 | Kemp ................ G01B 9/02004 356/491 |

* cited by examiner

Primary Examiner — Hwa Andrew Lee

(57) ABSTRACT

The system and methods are made to apply interferometry to ophthalmic applications. The system makes use of a low-coherence interferometer to obtain a plurality of measurements of a contacts lens. The system and methods characterizes the surface profile of both surfaces of a contact lens, a thickness profiles, and combines these measurements with an index information to reconstruct a complete model of the contact lens.

8 Claims, 7 Drawing Sheets

FIG. 8A
FIG. 8B
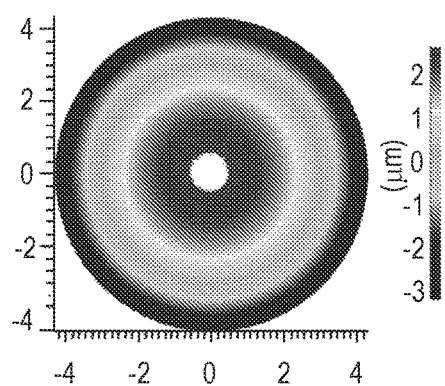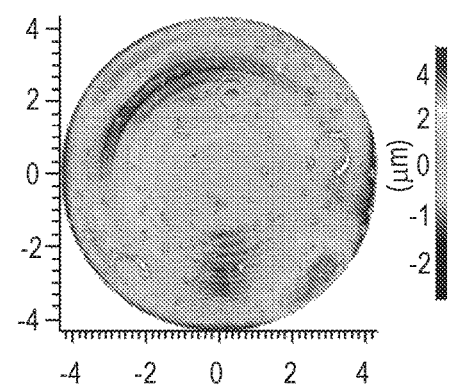
FIG. 9
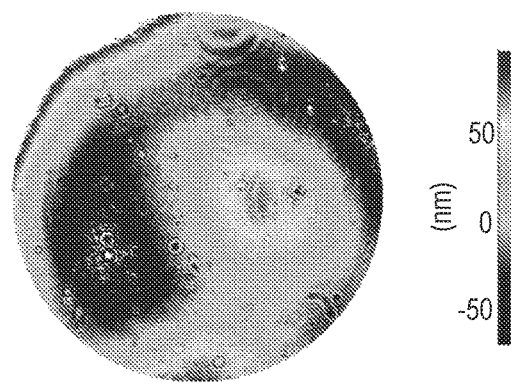

CHARACTERIZING THE SURFACE OF A CONTACT LENS WITH AN IMMERSED REFERENCE PRISM

CROSS REFERENCE TO RELATED APPLICATIONS

The present application is a divisional application of U.S. patent application Ser. No. 15/952,354, filed on Apr. 13, 2018, which is a divisional application of U.S. patent application Ser. No. 14/830,076 filed on Aug. 19, 2015 which claims the benefit of U.S. Provisional Patent Application No. 62/039,682 filed on Aug. 20, 2014.

I. FIELD OF THE INVENTION

The invention relates generally to optics and more specifically to systems and methods for measuring optical and physical characteristics of contact lens.

II. BACKGROUND OF THE INVENTION

Contact lenses fulfill approximately one-third of all ophthalmic correction needs with over 125 million wearers worldwide. The contact lens industry has made great advancements in the field of vision correction. Manufacturers are progressing toward providing contact lenses that are designed to match a patient's refractive correction and fit. By moving beyond standard spherical lenses, manufacturers will be able to provide contact lens wearers with better visual acuity and overall comfort. For contact lens manufacturers, the size and diversity of the worldwide marketplace leads to a variety of contact lens designs and products providing treatment for myopia, hyperopia, presbyopia, and other conditions related to eyesight.

Many metrology methods rely on techniques used for rigid lenses and are not useful for measuring soft lenses. The very nature of a soft contact lens often precludes the use of these conventional metrology methods. A typical soft contact lenses has a thickness on the order of 100 µm-200 µm. Soft contact lenses can range from approximately 25% to 75% water by volume, are unstable in the air due to evaporation and given the general shape and materials necessary for eye performance, soft contact lenses lack the structure to support kinematic mounting.

Current metrology, such as methods based on focimeters and moiré deflectometry, lacks the combination of spatial resolution, high sensitivity, and large dynamic range desired to accurately measure more advanced lenses. These metrology techniques generally are limited to ophthalmic testing of the effective power of a lens and indirect measurements of power by translating a lens until collimation is detected.

U.S. Pat. No. 7,688,453 discloses the utilization of a modified Mach-Zehnder (MZ) interferometer to analyze the transmitted, aspherical wavefront of an ophthalmic lens by mounting the lens in a cuvette having a rotatable carousel that can hold multiple lenses. Fresh, temperature controlled saline solution is circulated about the lenses, and the cuvette is positioned in a vertical test arm of the interferometer configuration. Reverse raytracing can be utilized to remove aberrations induced into the measured wavefront as it is imaged by the optical components and lenses in the interferometer system to the detector of the interferometer. If the index of refraction of the contact lens is known, the measured wavefront produced by this measurement can be used to produce a thickness profile of the contact lens.

U.S. Pat. No. 8,641,194 discloses an in vivo method of characterizing dynamic tears using a near infrared phase-shifting interferometer. The interferometer continuously measures light reflected from the tear film, allowing precision analysis of the dynamic surface topography. Movies showing the tear film behavior may be generated along with quantitative metrics describing the tear film surface as it changes in time.

Notwithstanding the usefulness of the above-described methods, a need exists for to provide robust, flexible, sustainable, and accurate metrology of contact lens.

III. SUMMARY OF THE INVENTION

The invention in at least one embodiment includes a system for characterizing the surface properties of one or both surfaces of a contact lens. The system having: an optics assembly including a light source configured to generate a low coherence light beam; a beam splitter configured to create a first light beam and a second light beam from the light beam generated by the optics assembly; a diverger assembly including at least one lens configured to propagate the first light beam; a measurement assembly configured to house the contact lens and receive the first light beam from the diverger assembly and direct the first light beam to at least one contact lens surface, the at least one contact lens surface creating a first reflected light beam and the measurement assembly being configured to direct the first reflected light beam towards the beam splitter; a reference assembly configured to receive the second light beam and direct a second reflected light beam to the beam splitter to provide a wavefront reference for measuring the contact lens; and an imaging assembly, and wherein the beam splitter being configured to merge the first reflected light beam and the second reflected light beam into a combined light beam and directing the combined light beam to the imaging assembly, and the imaging assembly configured to receive the combined light beam from the beam splitter and create an image with an interference pattern from the combined light beam.

In a further embodiment, the measurement assembly includes: a cuvette configured to hold the contact lens to be characterized; a distance measuring device; and a controller that moves the contact lens to multiple positions in the measurement assembly and for controlling the path length through the reference assembly based on at least the location of the contact lens as provided by the distance measuring device. In a still further embodiment, the distance measuring device is configured to track a plurality of positions of the contact lens, and the controller configured to calculate the distances between the confocal measurement position and cat's eye focal measurement position based on position signals received from the distance measuring device.

In a further embodiment to any of the above embodiments, the beam splitter includes at least one of a polarizing beam splitter, plate beam splitter, and a cube beam splitter. In a further embodiment to any of the above embodiments, the measurement assembly includes: a mounting structure having a ring configured to mount the contact lens into a position for receiving of the first light beam; and a cuvette containing at least one chamber configured to be filled with fluid into which the contact lens and the mounting structure are placed during characterization of the contact lens.

In a further embodiment to any of the above embodiments, the reference assembly includes: a reference prism configured to match the optical path lengths and material dispersions of the second light beam to the optical path lengths and material dispersions of the first light beam passing through the diverger assembly and the measurement assembly; a tank configured to be filled with fluid such that at least part of the reference prism is submerged into the fluid; and a reference tank window configured to provide shifting motion of the second light beam to balance the motion of the contact lens in the fluid filled cuvette, and wherein the reference prism causes the second light beam to pass through the reference prism and return back at least part of the second light beam through the fluid in the tank to the beam splitter.

In a further embodiment to any of the above embodiments, the imaging assembly is configured to collect the surface properties of the at least one contact lens surface from at least one of at least one cat's eye focal measurement position and at least one confocal measurement position. In a further embodiment to any of the above embodiments, the system further having a computer-implemented device configured to use optical modeling to compensate for the refraction that occurs at a first face of the contact lens when measuring a subsequent surface, and wherein the imaging assembly is configured to collect the surface properties of the contact lens on the subsequent face of the contact lens from at least one of an optical cat's eye focal measurement position and an optical confocal measurement position. In a further embodiment to any of the above embodiments, the imaging assembly including a processor configured to execute a program for calculating a number of measurements of at least one of the at least one contact lens surface and at least one thickness of the contact lens. In a further embodiment to any of the above embodiments, the reference assembly includes at least one member having a phase-shifting surface. In a further embodiment to any of the above embodiments, the measurement assembly is configured to provide a measurement wavefront to the at least one contact lens surface by propagating the first light beam to the at least one contact lens surface and returning the first reflected light beam towards the beam splitter.

The invention in at least one embodiment includes a method for producing a whole lens reconstruction of a contact lens. The method including: moving at least one contact lens through a series of positions, each position relates to a plurality of contact lens surfaces; and adjusting a submersion depth of a reference prism to match a path length for at least one contact lens position, for each contact lens position: generating a planar low coherence light beam from a light source, splitting the generated light beam by a beam splitter into a first light beam and a second light beam, propagating the first light beam to a measurement assembly, the measurement assembly directing the first light beam onto a contact lens surface which reflects at least part of the first light beam back to the beam splitter as a first reflected light beam, propagating the second light beam to a reference assembly, the reference assembly reflecting at least part of the second light beam to the beam splitter as a second reflected light beam to provide a wavefront reference for measuring the contact lens, merging the first reflected light beam and the second reflected light beam by the beam splitter to form a combined light beam, and the beam splitter directing the combined light beam to an imaging assembly, the imaging assembly focusing the combined light beam to form an optical image of the contact lens containing an interference pattern; correcting at least one optical image for any refractions that are present from one surface of the contact lens that arise during measurement when the light beam passes through the one surface to reach another surface of the contact lens; and producing a whole lens reconstruction based on the plurality of optical images of the contact lens, and wherein the whole lens reconstruction includes at least one thickness of the contact lens and surface properties of the plurality of surfaces of the contact lens.

In a further embodiment to the prior embodiment, the positions include: a confocal measurement position for each surface of the contact lens; and a cat's eye measurement position for each surface of the contact lens. In a further embodiment to the previous embodiment, the method further includes calculating the at least one thickness of the contact lens between opposing surfaces of the contact lens. In a further embodiment to the previous two embodiments, the method further includes calculating the at least one thickness profile of the contact lens based upon the at least one thickness and the surface properties of the opposing surfaces of the contact lens. In a further embodiment to the three previous embodiments, the method further includes calculating a transmitted wavefront map of the contact lens based upon all of the thickness profiles of the contact lens and respective values for an index of refraction of the thickness profiles.

In a further embodiment to the first method embodiment, wherein the plurality of surfaces of the contact lens includes a first surface and a second surface; and the positions include: a confocal measurement position for the first surface and the second surface, and a cat's eye measurement position for the first surface and the second surface, and the method further including: calculating the thickness of the contact lens between the first surface and the second surface; and calculating the thickness profile of the contact lens based upon the thickness and the surface properties of the first surface and the second surface.

In a further embodiment to the first method embodiment, the positions include a confocal measurement position for the concave surface of the contact lens, a cat's eye measurement position for the concave surface of the contact lens, an optical confocal measurement position for the convex surface of the contact lens, and an optical cat's eye measurement position for the convex surface of the contact lens since the measurements of the convex surface are made through the concave surface must be corrected for refraction. In a further embodiment to any of the prior embodiments, the positions include a confocal measurement position for each surface of the contact lens; and a cat's eye measurement position for each surface of the contact lens.

In a further embodiment to any of the prior method embodiments, the method further including creating at least one simulated whole lens reconstruction with a processor using calculated measurements of at least one surface of the contact lens and the thickness profile of the contact lens obtained from a separate measurement. In a further embodiment to any of the prior method embodiments, the method further including creating at least one simulated whole lens reconstruction with a processor using calculated measurements of at least one of one surface of the at the plurality of contact lens surfaces, a transmitted wavefront map of the contact lens obtained from a separate measurement, and an index of refraction of the contact lens.

The invention in at least one embodiment includes a method for simulating a whole lens reconstruction. The method including: generating a light beam from an optics assembly, wherein the optics assembly includes a light source to generate a low coherence light beam, and at least one collimation lens configured to provide the light beam with a planar wavefront; splitting the light beam with a beam splitter into a first light beam and a second light beam; propagating the first light beam to a measurement assembly, wherein the measurement assembly includes a cuvette containing at least one chamber filled with fluid in which a contact lens sits, and a mounting structure on which the contact lens is placed into a position for receiving of the first light beam, the measurement assembly directing the first light beam onto a contact lens surface to cause return of a first reflected light beam back towards the beam splitter; propagating the second light beam to a reference assembly, wherein the reference assembly includes a reference prism configured to match the optical path lengths and material dispersions of the second light beam to the optical path lengths and material dispersions of the first beam in the measurement assembly, a tank filled with fluid and configured to at least partially submerge the reference prism into, and a reference tank window configured to provide shifting motion of the second light beam to balance the motion of the contact lens in the fluid filled cuvette, and wherein the reference prism causes the second light beam to pass through the reference prism and return a second reflected light beam through the fluid in the tank to the beam splitter; combining the first reflected light beam and the second reflected light beam with the beam splitter to form a combined light beam; directing the combined light beam from the beam splitter to an imaging assembly having a detector, wherein the imaging assembly detecting with the detector at least one fringe pattern of the combined light beam and interference patterns of the combined light beam to form an optical image of the contact lens; moving the contact lens held in the cuvette through a series of measurement positions to provide a plurality of optical images to be detected by the imaging assembly; correcting at least one optical image for any refractions that are present from another surface of the contact lens that arise during measurement; and producing a whole lens reconstruction based on the plurality of optical images of the contact lens, and wherein the whole lens reconstruction includes the at least one thickness of the contact lens and surface properties of the plurality of contact lens surfaces.

IV. BRIEF DESCRIPTION OF THE DRAWINGS

In the following description, reference is made to accompanying drawings, which are provided for illustration purposes as representative of example embodiments. Given the following description of the specification and drawings, the systems and methods should become evident to a person of ordinary skill in the art. It is to be understood that other embodiments can be utilized and that structural changes based on presently known structural and/or functional equivalents can be made without departing from the scope of the invention. The use of cross-hatching in the figures is not intended to represent the material composition of the element, but instead to show the presence of a cross-section.

FIGS. 8A and 8B show the transmitted wavefront of the same contact lens as measured by a Mach-Zehnder interferometer with the plot illustrated in FIG. 8A showing the measured wavefront with nine Zernike polynomial terms removed.

FIG. 9 illustrates the difference between the simulated transmission wavefront based upon the whole lens reconstruction model and the actual measured transmitted wavefront.

V. DETAILED DESCRIPTION OF THE DRAWINGS

At least one embodiment of invention involves providing full surface description of at least one contact lens, such as and including, the radius of curvature and surface shape for one or both surfaces of a contact lens, and the thickness of the lens. In at least one embodiment, a system and/or a method obtains information that is utilized to evaluate a wide range of ophthalmic lens types by measuring a number of characteristics related to the lens. In at least one embodiment, a system and/or a method fully characterizes surface properties and thickness of a soft contact lens.

Figure 1A:
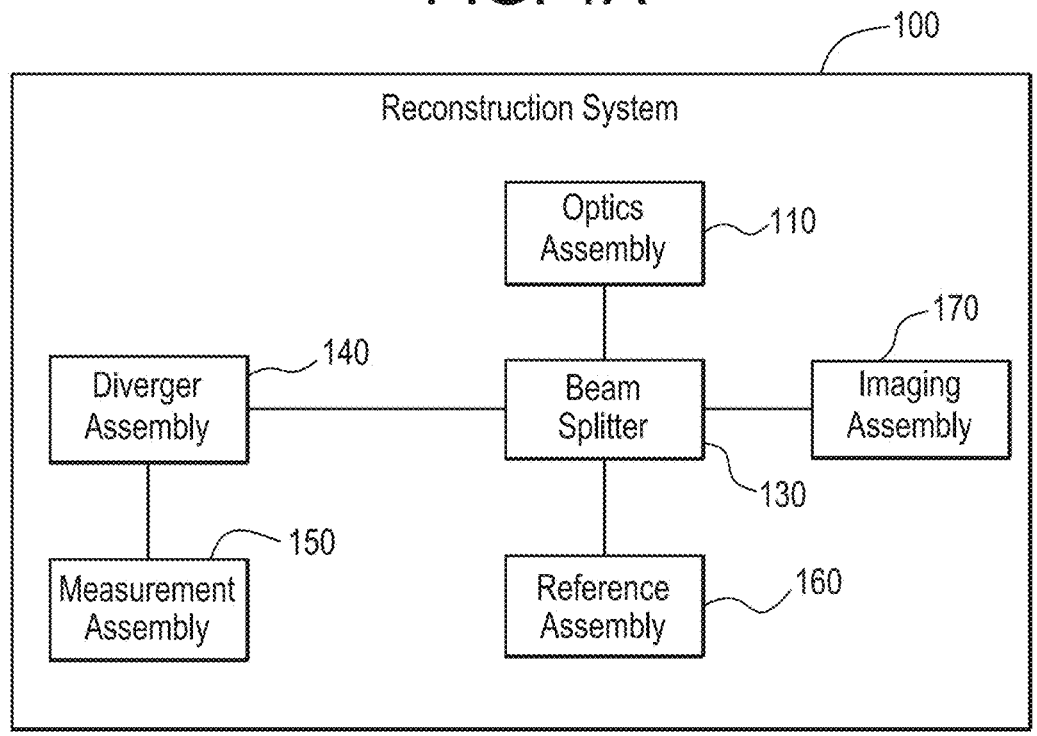
FIGS. 1A and 1B illustrate block diagrams of systems for measuring ophthalmic lens used in whole lens reconstruction according to at least one embodiment of the invention.

FIG. 1A illustrates a system according to least one embodiment. The illustrated reconstruction system 100 provides an example of a system for testing and determining the characteristics of contact lenses. The illustrated reconstruction system 100 includes an optics assembly 110, a beam splitter 130, a diverger assembly 140, a measurement assembly 150, a reference assembly 160, and an imaging assembly 170. In an alternate embodiment, the reconstruction system 100 includes a phase-shifting interferometer. Examples of the phase-shifting interferometer include, but are not limited to, any interferometer or a variation of an interferometer, adapted to measure at least one surface of a contact lens, such as a low coherence Twyman-Green phase-shifting interferometer.

The illustrated reconstruction system 100 provides a way to measure at least one characteristic of the contact lens by propagating a first light beam at the contact lens to cause reflections from the concave and convex surfaces and a second light beam through a reference prism that is adjustable to compensate for the path length through the contact lens. In at least one embodiment, the respective light beams propagate through their target and then are reflected back to be combined back together to form a light beam having information regarding characteristics of the contact lens.

The optics assembly 110 generates a light beam that is transmitted to the beam splitter 130. In at least one embodiment, the generated light beam has a planar wavefront. The beam splitter 130 splits the received light beam into two separate light beams that, in at least one further embodiment are substantially identical light beams. The beam splitter 130 sends the first light beam to the diverger assembly 140 and the measurement assembly 150, which in at least one embodiment together are a testing assembly and/or a test arm. The contact lens to be tested sits in the measurement assembly 150. The beam splitter 130 sends the second light beam to the reference assembly 160, which in at least one embodiment is a reference arm. These assemblies provide a reflected light beam (e.g. a first reflected light beam and a second reflected light beam) back to the beam splitter 130 to be recombined together before being sent to the imaging assembly 170 for creation of an image of the contact lens. An interference pattern is produced in this image which encodes information about the optical and/or physical characteristics of the contact lens being characterized.

Figure 1B:
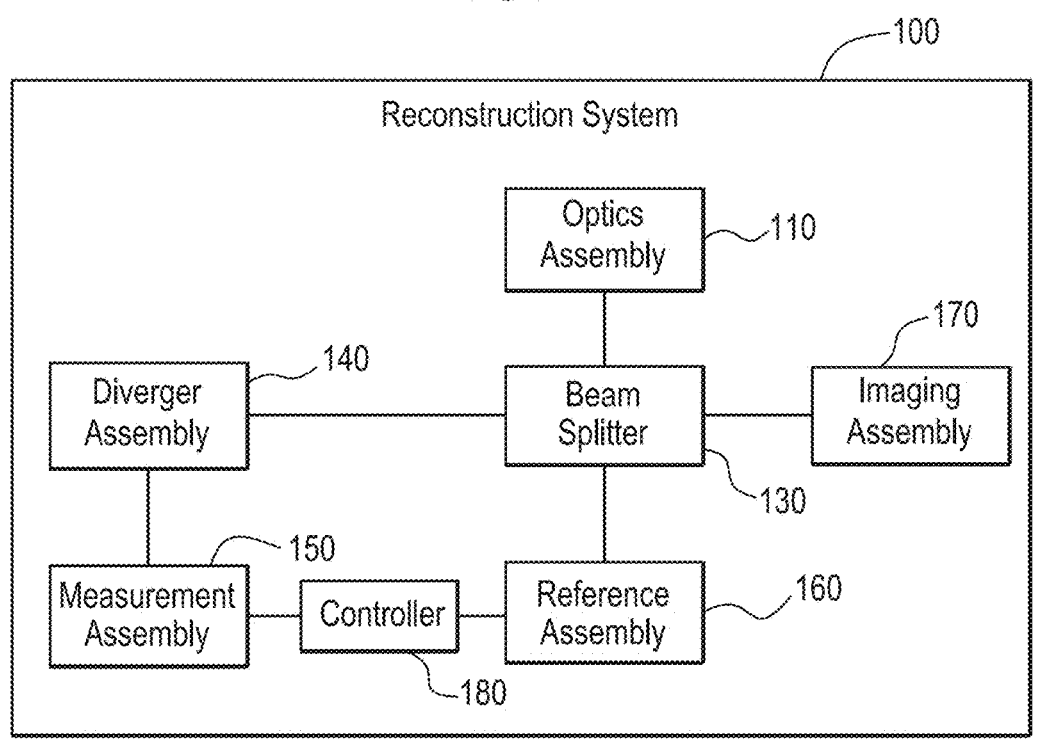

FIG. 1B illustrates an alternate embodiment that includes a controller (or computer controller) 180. The controller 180 controls the propagation of light beams in the reconstruction system 100 in terms of the path lengths that the two split light beams travel. The controller 180 controls the location of the mounting structure in the measurement assembly 150 to place the contact lens at predetermined positions for different measurements to be taken. In at least one embodiment, the means for controlling the motion, such as the controller 180, is a computer-implemented or computer-aided device for programmed execution or a mechanical device connected to the system 100 for manual operation.

Figure 2:
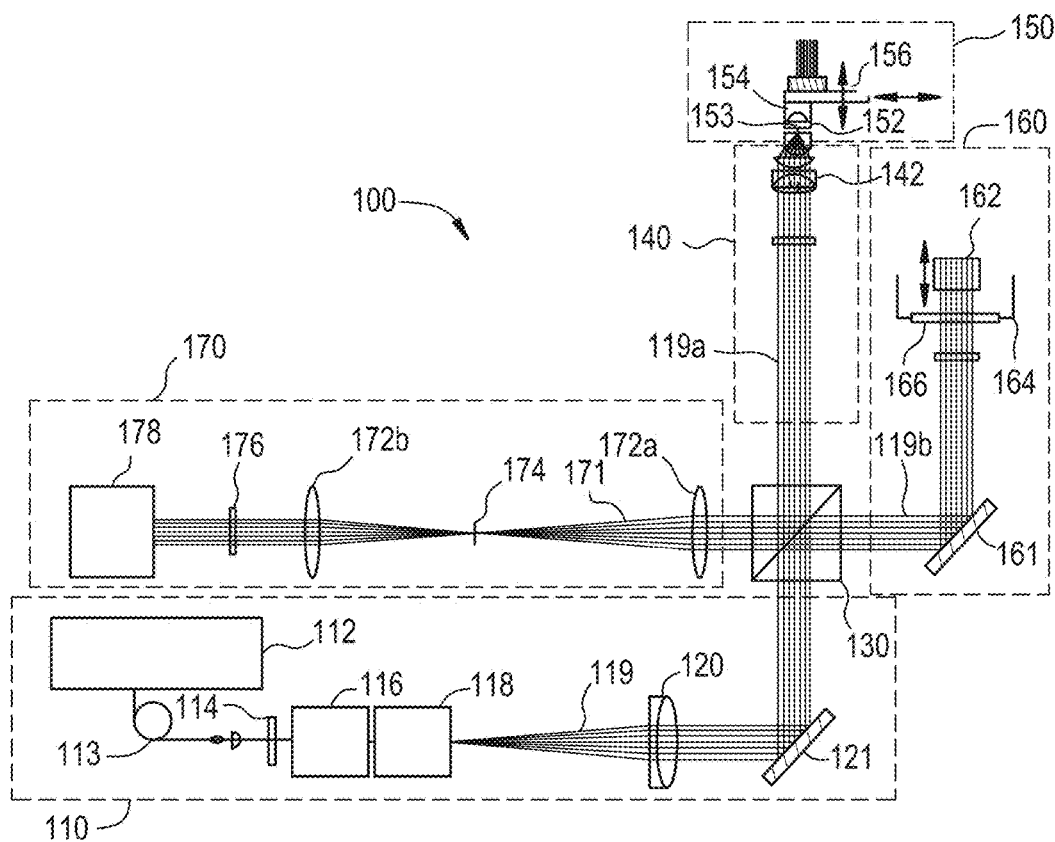
FIG. 2 illustrates a schematic diagram of a system for measuring ophthalmic lens used in whole lens reconstruction according to at least one embodiment of the invention.

FIG. 2 is a more detailed illustration of example components that may be included in the assemblies illustrated in, for example, FIGS. 1A and 1B. The illustrated reconstruction system 100 in FIG. 2 shows an example location in the system for the cuvette used for immersing the contact lens sample in a fluid such as water, saline, and saline solution.

FIG. 2 illustrates the optics assembly 110 that generates a polarized plane wave in the system. The illustrated optics assembly 110 includes a light source 112, a fiber 113, an isolator 116, a spatial filter 118, polarization optics, and a collimation lens 120. In at least one embodiment, the proximity of the surfaces of a contact lens requires a low coherence light source with a bandwidth narrow enough to isolate one of the two surfaces of the contact lens so that interference is obtained from only one surface of the contact lens at a time. An example of a suitable light source is a super luminescent light emitting diode but is not limited in this regard and a higher power diode or other diodes may also be used as alternatives. In at least one embodiment of the invention, the source wavelength from the light source 112 is approximately 651.4 nm with a coherence length of approximately 56 nm but may also be any width and length suitable for producing an accurate measurement. In such an embodiment, the feedback into the diode can be less than −30 dB for accurate measurement and requires isolating the light source 112. In alternate embodiments, one or more of the illustrated components are omitted.

The illustrated optics assembly 110 includes the fiber 113 optically coupled to the light source 112 that allows an aspheric lens to be adjusted to collimate the cone of light leaving the fiber tip. An example of the fiber 113 is an APC (Angled Physical Contact) connector where the end of the fiber is cleaved at an angle to reduce back reflections into the fiber 113. In an alternative embodiment, the fiber 113 is incorporated into the light source 112 or omitted.

The isolator 116 is used to optically isolate the light source 112. The fiber 113 accepts a diameter free propagating light beam from the light source 112 to be collimated and passed through to the isolator 116. In alternate embodiments, the isolator 116 includes a plurality of polarizers and a faraday rotator. In at least one embodiment, these isolator elements include polarization optics controlling the polarization state of light propagating through the reconstruction system 100. After the light beam passes through the isolator 116, the light beam is filtered by the spatial filter 118 and expanded into a larger beam diameter. The spatial filter 118 conditions the light beam from the light source 112 to have a uniform beam and maximize measurement accuracy across the test surface. A light beam 119, passes from the spatial filter 118 to a collimation lens 120. The presence of the mirror reduces the footprint of the system by changing the orientation of the light beam 119. In at least one embodiment, the collimation lens 120 further increases uniformity of the light beam 119 and improves accuracy by causing the light beam to become a planar light wavefront.

After the light beam 119 passes from the optics assembly 110, it is propagated into a beam splitter 130 that receives the light beam 119 and splits the light beam 119 into two light beams: a first light beam 119a and a second light beam 119b. The beam splitter 130 propagates the two beams, respectively, towards the diverger assembly 140 and the reference assembly 160. In at least one alternative embodiment, the collimation lens 120 propagates the light beam 119 to the beam splitter 130 reflected off a mirror such as an optional fold mirror 121 as illustrated in FIG. 2. In an alternate embodiment, a mirror, such as the optional folder mirror 121 is computer controlled to propagate the light beam.

The light beam 119 may be split in several ways, such as intensity splitting or polarization splitting. In at least one embodiment, polarization splitting is used to maximize light throughput and allow the amount of light sent down each arm of the system (or an interferometer) to be changed during alignment. In at least one embodiment to splitting the polarization, a polarization beam splitting cube will divide the light beam into two orthogonal states. The beam splitter 130 transmits the beam polarization as S polarized or P polarized. In at least one embodiment, the light beam is divided into orthogonal states with an extinction ratio of about 1:1500 so that excellent polarization purity is obtained. This polarization can be reflected or transmitted by the polarizing beam splitter 130 so that it can continue on to the detector (e.g., a camera 178) and measure at least one surface of a contact lens.

An example of the beam splitter 130 includes two triangular glass prisms affixed together at their base using different materials, such a polyester, epoxy, or urethane-based adhesives. A further example of the beam splitter is prisms affixed together by other means such as fusing or welding. In this example, the hypotenuse of one or both prisms is coated with optical thin films to provide a partial reflection at the surface and divide the incoming beam into two beams. The coating can be adjusted to provide any ratio of resulting beam intensities and a 50/50 split is common. The coatings can also be polarization sensitive so that one input polarization is reflected and the other transmitted. In an alternate embodiment the beam splitter may be uncoated 130. Further examples of a beam splitter are a plate beam splitter or a pellicle beam splitter.

In the illustrated embodiment, the diverger assembly 140 includes diverger lens 142 which is designed to produce a flat or spherical wavefront at one wavelength. The diverger lens 142 can include a number of lenses configured to control wavefront aberrations. The diverger lens 142 may also include compensators to produce a flat or spherical wavefront, and the wavefront can be constrained by color, stray light and tolerance to improve measurement accuracy.

In at least one embodiment, the diverger lens 142 is spaced far enough from the last surface of the measurement assembly 150 so that the light focus of the diverger lens 142 can be placed on either surface of the contact lens sitting in a fluid filled cuvette 154. One position is known the cat's eye focal position and can also be used to measure the radius of curvature of the contact lens.

In at least one embodiment, the illustrated diverger lens 142 is configured so that the visibility of the contact lens is maximized and uniform across the detector (or camera 178). In a further embodiment, the arrangement of the diverger lens 142 is configured to prevent stray reflections from the element surfaces within the diverger assembly 140, such as retro reflected beams from these surfaces. In an alternative embodiment, the diverger lens 142 is configured so that reverse ray tracing methods can be applied for improved accuracy in reconstruction surfaces with large departures from a spherical wavefront. In this alternative embodiment, the diverger lens 142 produces a color corrected spherical wavefront in saline solution to measure a 10 mm diameter on an 8 mm radius of curvature surface while contributing minimal amounts of stray light. In at least one embodiment, the color correction may be done over the spectral bandwidth of the source.

Figure 3:
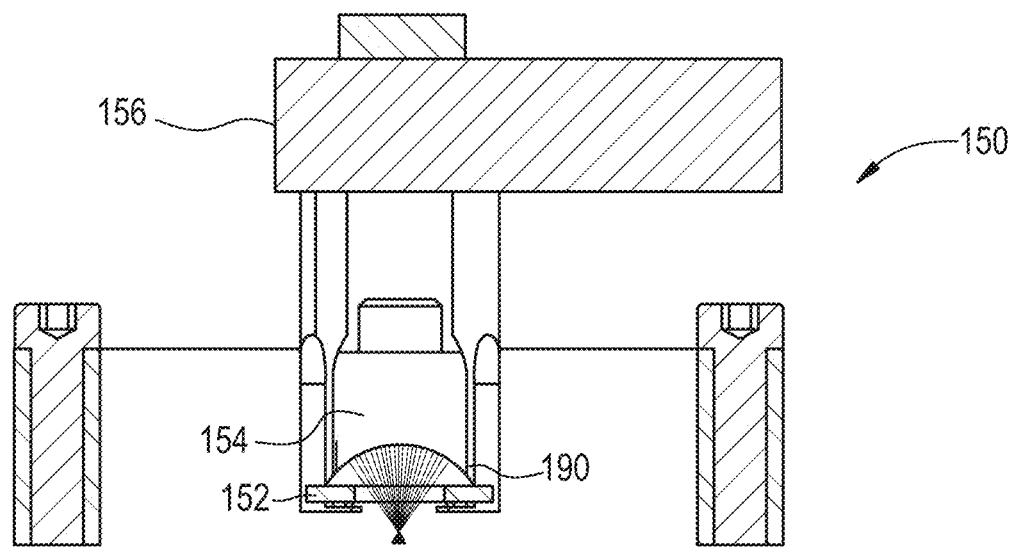
FIG. 3 illustrates a measurement assembly according to at least one embodiment of the invention.

The first light beam 119a propagates from the diverger assembly 140 to the measurement assembly 150. FIGS. 2 and 3 illustrate the measurement assembly 150 as having a measurement cuvette (or a cuvette) 154, which in at least one embodiment includes a chamber for holding a contact lens in saline solution or in an alternative embodiment includes a plurality of chambers configured to be filled with saline solution in which a respective contact lens may sit. One of ordinary skill in the art should understand based on this disclosure the cuvette 154 can be filled with saline solution, water, or any suitable fluid. The illustrated measurement assembly 150 further includes a mounting structure 152, which, for example, has a plate with a hole 153 passing therethrough. In at least one embodiment, the contact lens sits directly over the hole 153 so that the concave surfaces of the contact lens 190, illustrated, for example, in FIG. 3, can be addressed through the hole 153 by the light propagating from the diverger assembly 140. In at least one embodiment, the mounting structure 152 is attached to translation stages for alignment of the contact lens 190 with respect to the diverger lens 142 and to translate the contact lens 190 to the required measurement positions, for example, as selected by the controller 180 in FIG. 1B. In this embodiment, the plate of the mounting structure 152 is designed to have the hole 153 directly in the middle of the plate but the mounting structure 152 is not limited in this regard and the hole 153 can be located in any position in the plate. In an alternative embodiment, the plate is a thin plate having sufficient size and rigidity to support the contact lens but is not limited in this regard and can be any width suitable to allow the necessary light propagation of the first light beam 119a. Examples of the mounting structure include, but are not limited to, an annular glass disk, metal plate, plastic disk, or any suitable material that allows propagation of the first light beam 119a. An alternate embodiment to the illustrated mounting structure 152 is that the contact lens is placed on a ring such as a cylindrical ring or tube, an annular ring, or other structure providing a frame on which the contact lens may receive support.

FIG. 2 illustrates the first light beam 119a passing through the diverger lens 142 of the diverger assembly 140 into the measurement assembly 150. The illustrated measurement assembly 150 in FIGS. 2 and 3 includes the mounting structure 152, the cuvette 154, and a distance measuring device 156. In at least one embodiment, the first light beam 119a propagates from the diverger lens 142 through the hole 153 in the mounting structure 152 onto the contact lens 190 held in the cuvette 154. At least part of the first light beam 119a is returned back as a first reflected light beam from the measurement assembly 150 towards the beam splitter 130 in a modified state representative of characteristics of the contact lens 190.

In at least one embodiment, the contact lens 190 in the cuvette 154 sits in a temperature-controlled saline solution within a test chamber of the cuvette 154. Examples of how the contact lens 190 and the mounting structure 152 are placed in the saline solution include, but are not limited to, submersion of the cuvette into saline solution or filling the chamber inside of the cuvette with saline solution. In at least one embodiment, the saline solution has a refractive index close to water, i.e., n=1.33, when the lens sample can be composed of a hydrogel material having an refractive index around 1.4, which can lead to an approximate reflectivity of the saline/hydrogel interface of 0.07% at normal incidence using the Fresnal reflection equation. Alternatively, the contact lens may be held in place by gravity, clamping, fastening or any other suitable means for restricting it on the mounting structure 152. An example of the cuvette includes a small tube of circular or square cross section, sealed at least one end, made of any suitable material such as plastic, glass, or fused quartz and designed to hold samples for spectroscopic experiments. In alternative embodiments, the cuvette 154 has multiple test chambers for holding multiple contact lenses. In further embodiments, the cuvette 154 may have other functional components to use in the system or method such as a cuvette with a number of windows which are located on a carousel that rotates the test cells between the loading access points. In a further embodiment, the mounting structure 152 positions and moves the contact lens 190 to a plurality of measurement positions. In an alternate embodiment, the cuvette 154 is repositionable in three-axis for locating a particular test chamber at a desired position.

The contact lens 190 can be positioned in any position relative to the focus, such as the cat's eye and confocal positions (or locations), to make measurements of the contact lens. A distance measuring device 156 may detect the contact lens' position (or location). Both surfaces of the contact lens can be measured from the same (or one) side of the contact lens 190. In at least one embodiment to measure the surfaces of the contact lens, the contact lens 190 can be mounted in the concave down orientation so that the posterior surface of the contact lens is closest to the diverger lens (or transmission sphere). In at least one embodiment, the contact lens is a meniscus element which allows both surfaces of the contact lenses to be examined by the first light beam with small translation of the contact lens with respect to the diverger lens.

Examples of the distance measuring device 156 include a micrometer, a distance measuring interferometer, a glass scale linear encoder, or time of flight system.

Figure 4:
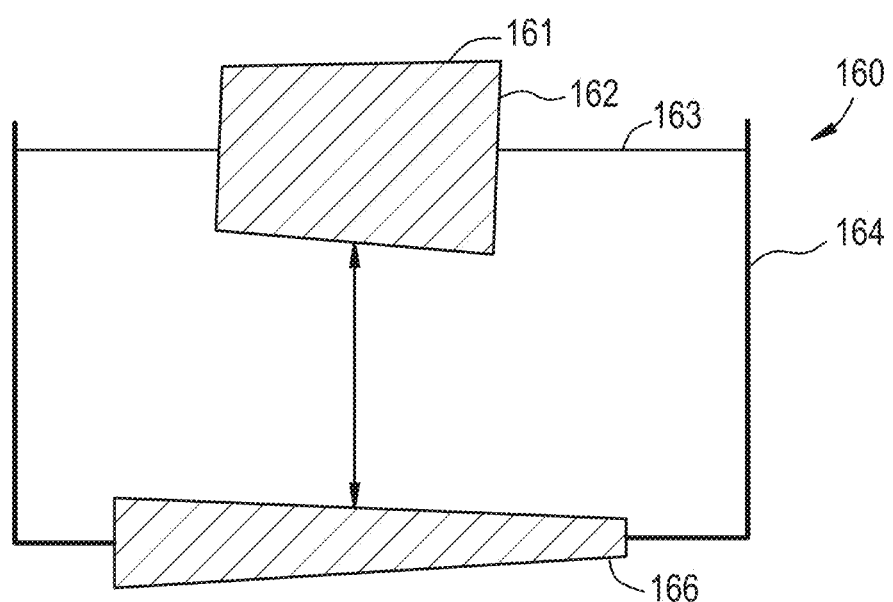
FIG. 4 illustrates a reference assembly according to at least one embodiment of the invention.

The second light beam 119b from the beam splitter 130 is directed into the reference assembly 160 illustrated in FIGS. 2 and 4. In an alternate embodiment, a member 161 having a phase-shifting surface is computer controlled to phase shift the light beam into and from the reference assembly 160. In at least one embodiment, the member 161 is a mirror such as a phase-shifting mirror. This computer control can introduce the optical phase shifts necessary for phase shifting interferometry. The reference assembly 160 serves to match the optical paths of the second light beam 119b to those encountered by the first light beam 119a in the diverger and measurement assemblies. The reference assembly 160 also serves to return the second light beam 119b back to the beam splitter 130 to provide a wavefront reference for measuring the contact lens characteristics.

The illustrated reference assembly 160 includes a tank 164 configured to be filled with fluid 163 for submersion of a reference prism 162 such as a glass or plastic prism. In at least one embodiment, the fluid matches the fluid present in the cuvette 154 and/or is saline or a saline solution. In at least one embodiment, the reference assembly 160 also includes a reference tank window 166 through which the second light beam 119b travels. In at least one embodiment, the reference prism 162 and/or a reference surface reflects the second light beam 119b that travels through the reference tank window 166 and the fluid 163 to match the path length of the first light beam 119a through the glass in the diverger assembly 140 and the fluid in the measurement assembly 150 in order to provide a reference path to compare at least one characteristic of the contact lens being measured. In at least one embodiment, the reference surface is the opposing surface of the reference prism 162 that initially receives the second light beam 119b.

FIG. 4 illustrates an example arrangement of the reference assembly 160 where the reference tank window 166 is located on the bottom of the tank 164 but is not limited in this regard and the reference tank window can be in any position to receive/transmit the second light beam 119b. The reference tank window 166 allows the second light beam 119b to pass into the tank 164 and through reference prism 162 and return back through the fluid 163 in the tank 164 and through the reference tank window 166. The submersion depth of the reference prism 162 controls the path length through the fluid 163 that the second light beam 119b travels to allow for matching the path length of the first light beam 119a. In an alternative embodiment as discussed previously, the submersion depth of the reference prism 162 is computer controlled based on information received from the measurement assembly 150 regarding the location of the contact lens 190.

FIG. 2 also illustrates an alternative embodiment where the reference assembly 160 includes a mirror 161 such as a phase shifting PZT mirror. The illustrated mirror 161 allows for redirection of the second light beam 119b from a horizontal path to a vertical path allowing the reference assembly 160 to have a vertical orientation. In an alternative embodiment, the orientation of the beam splitter 130 is such that the light beam 119b has a substantially vertical path towards the reference tank 164.

The beam splitter 130 receives the first reflected light beam from the diverger assembly 140 and the measurement assembly 150 and the second reflected light beam from the reference assembly 160. One of ordinary skill in the art should understand based on this disclosure that the first light beam and the first reflected light beam provide a first path length and travel the same path and should also understand that the second light beam and the second reflected light beam provide a second path length and travel the same path. The beam splitter 130 merges the first reflected light beam and the second reflected light beam together to form a combined light beam 171, which is propagated to the imaging assembly 170.

FIG. 2 illustrates the imaging assembly 170 that forms an optical image from the combined light beam 171. The illustrated imaging assembly 170 includes a plurality of relay lenses 172a, 172b, an imaging path spatial filter 174, a polarizer 176 and a camera (or detector) 178. Although in alternate embodiments, one or more of the illustrated components are omitted.

The plurality of relay lenses includes at least two lenses such as a first relay lens 172a and a second relay lens 172b. In this embodiment, a first relay lens 172a focuses the merged beam 171 between the two lenses 172a, 172b. In the illustrated embodiment, a spatial filter 174 is placed at this location to block unwanted beams or stray light. These unwanted beams may arise from a back reflection from any of the optical surfaces in the light beam paths, such as a surface of a lens element in the diverger assembly.

The relay lenses 172a, 172b may have long focal lengths or short focal lengths and still provide the same magnification. The relay lenses 172a, 172b work together to provide an image of the desired measurement plane, such as the surface measurements for contact lens or a pupil for the cat's eye measurement on the detector. The relay lenses 172a, 172b may have any shape but in at least one embodiment the relay lenses 172a, 172b are commercially available lenses, such as a plano-convex, biconvex, or achromatic doublet lenses as these types of lenses contribute the minimum of spherical and corrects for other aberrations when imaging the testing surface, e.g., the first reflected light beam from the measurement assembly 150. The plano-convex, biconvex, or achromatic doublet lenses can also be chosen to provide a balance from aberrations such as field curvature that might be produced by the diverger assembly 140 and in at least one embodiment this provides an improved accuracy in reverse ray tracing.

FIG. 2 illustrates after the merged light beam 171 passes through the relay lens 172a, the imaging path spatial filter 154 and the relay lens 172b, the merged light beam 171 propagates to the polarizer 176. In at least one embodiment, the polarizer 176 is configured to control the polarization state of the merged light beam 171 before detection by the camera 178. The use of the polarizer 176 allows for the two returning beams to form an interference pattern on the camera 178. This interference or fringe pattern encodes the surface properties and/or characteristics of the contact lens or the radius of curvature in the cat's eye position.

In at least one embodiment, the camera 178 is any suitable camera that can be configured to detect a light beam 171. The camera 178 receives the merged light beam 171 from the polarizer 176 or the relay lens 172b to provide for detection of the fringe patterns of the merged light beam 171 to enable reconstruction of at least one surface of the contact lens in the cuvette 154. In an alternate embodiment, more than one camera can be used.

In at least one embodiment, the camera's specifications may include sensors quantum efficiency, noise level such as dark current, speed, bloom suppression, and well capacity. In such an embodiment, the camera may be a charged-coupled device (CCD), but is not limited in this regard and other imaging devices or active pixel sensors can be used instead. The camera is configured to interface with a computer.

In at least one embodiment, one or more of the assemblies are contained in a housing.

The testing of contact lenses provides an extremely useful assessment of optical performance to substantially describe and model the contact lens. In at least one embodiment, this modeling is achieved from the combination of surface measurements, radii of curvature and thickness measurements along with separate measurements of index of refraction for both the contact lens material and the saline solution.

Before providing a detailed description of the measurement process, it is appropriate to provide an overview of the measurement process for fully characterizing a contact lens in at least one embodiment. The concave or posterior surface of the contact lens is first measured. The contact lens on a mounting structure is translated (or repositioned) such that the focus of the diverger lens is coincident or nearly coincident with the center of curvature of the concave surface of the contact. This position is referred to as the confocal measurement position. This confocal measurement provides information about the surface figure of the concave surface. The contact lens is then translated until the focus of the diverger lens is at or near the concave surface of the contact lens—this is the cat's eye measurement position. The distance that the contact lens is translated between the confocal and cat's eye measurement positions provides information about the radius of curvature of the concave surface. The translation is along the optical axis of the contact lens and the translation distance is measured by, for example, an external distance measuring interferometer based upon the motion of the DMI flat mirror illustrated, for example, in FIGS. 2 and 3. The distance measuring device 156 can be attached directly to the contact lens mounting structure, measurement plate or any other suitable location in the measurement assembly 150. Note that errors in position of the contact lens at either the confocal or cat's eye measurement positions will result in changes to the fringe pattern recorded at either of these positions. In at least one embodiment, the processed interferograms (via phase shifting algorithms) are interpreted and used as a correction to the measured translation distance to get an improved measurement of the radius of curvature of the concave surface of the contact lens. Based on this disclosure, one of ordinary skill in the art should appreciate that these two measurements can be performed in any order.

If the thickness profile of the contact lens, such as is produced by the instrument described in U.S. Pat. No. 7,688,453, has been measured and the index of refraction of the contact lens has been determined by a separate measurement (or alternatively provided), a whole lens reconstruction of the contact lens can be obtained using the now measured properties of the concave surface. These three measurements can be combined to determine the surface profile and radius of curvature of the convex or anterior surface of the contact lens through modeling techniques. The whole lens reconstruction includes the surface profiles of both surfaces of the contact lens, the radii of curvature of both surfaces and the thickness at the vertex of the contact lens. The whole lens reconstruction is a three-dimensional model of the physical shape of the contact lens as it is while mounted in the cuvette of the low-coherence interferometry system described in connection with, for example, FIGS. 2-4.

In at least one embodiment, the reconstruction system 100 illustrated in FIG. 2 can independently produce a whole lens reconstruction of the contact lens without relying on a separate measurement of the thickness profile of the contact lens. The index of refraction of the contact lens may be independently measured or known.

In at least one embodiment, the illustrated low coherence interferometry system measures the convex or anterior surface of the contact lens through the now measured concave or posterior surface (as described above). In addition to the previous two measurements of the concave surface of the contact lens, two additional measurements of the contact lens are needed in at least one embodiment. The first is a confocal measurement of the convex surface. The contact lens is translated relative to the diverger lens so that the surface profile of the convex is measured. Since this measurement is made through the concave surface, it is not a true physical confocal measurement, but rather an optical confocal measurement. The wavefront from the diverger is modified as it passes through the concave surface, so this optical confocal measurement corresponds to the modified shape of the diverger wavefront matching the shape of the convex surface of the contact lens. The contact lens is then translated, for example, by the lens mounting structure to make a cat's eye measurement of the convex surface of the contact lens to determine information about the radius of curvature of this surface. As with the confocal measurement, this cat's eye measurement is also influenced by measuring through the concave surface. Optical raytrace or wavefront modeling may be performed using the previous measurements of the concave surface and the index of refraction of the contact lens to produce the actual measurements of the surface figure and radius of curvature of the convex surface of the contact lens.

In at least one embodiment, the whole lens reconstruction process with the low coherence interferometer requires a series of four measurements of the contact lens. The translated position of the contact lens is monitored by the distance measuring device so that relative positions of the contact lens at each measurement are known. In at least one embodiment, the distance measuring device is capable of measuring this position to a small fraction of a micrometer. The four measurements for a whole lens reconstruction include a confocal and cat's eye measurement of the concave surface of the contact lens, and a confocal and cat's eye measurement of the convex surface of the contact lens. As described above, these measurements of the convex surface are corrected with optical modeling to correct for the fact that they are measured through the concave surface of the contact lens. The thickness of the contact lens is determined by using this corrected cat's eye measurement along with the cat's eye measurement of the concave surface. The corrected translation distance between these two cat's eye measurements is the thickness of the contact lens. At the conclusion of this process, all of the properties of the contact lens are measured: the surface profile and radius of curvature of the concave or posterior surface of the contact lens, the surface profile and radius of curvature of the convex or anterior surface of the contact lens, and the vertex thickness of the contact lens. These measurements combine to produce the three dimensional whole lens reconstruction of the contact lens.

In at least one embodiment, the whole lens reconstruction of the lens as produced by the illustrated low coherence interferometry system provides a thickness profile measurement for the contact lens. This thickness profile when coupled with the index of refraction of the contact lens also enables a modeling of the transmitted wavefront through the contact lens. This modeled transmitted wavefront can be used to calculate the usual optometric quantities associated with contact lens such a power, astigmatism and power distribution.

It should also be noted that the measured fringe patterns associated with each of the four measurements may be influenced by errors associated with the propagation of the wavefront through the interferometer optics as they are imaged onto the detector (or camera). These are referred to as induced errors. In at least one embodiment, corrections are applied to each of the measurements to correct these errors. A reverse raytrace correction is applied based upon a model of the interferometer and the actual measurement. The result of this correction is an improved measurement of the surface profile and radius of curvature of both surfaces of the contact lens.

FIGS. 6A-9 discussed later provide an example of the images obtained from performing at least some of the above described steps. In at least one embodiment, an optical image is formed by an imaging device such as the camera 178 illustrated in FIG. 2. The optical image contains information that provides measurements of at least one surface of a contact lens, the thickness profile of the contact lens, and the index of refraction of the contact lens. In at least one embodiment, a computer controller or computer processor based device analyzes the image to calculate at least one of the characteristics.

Figure 5:
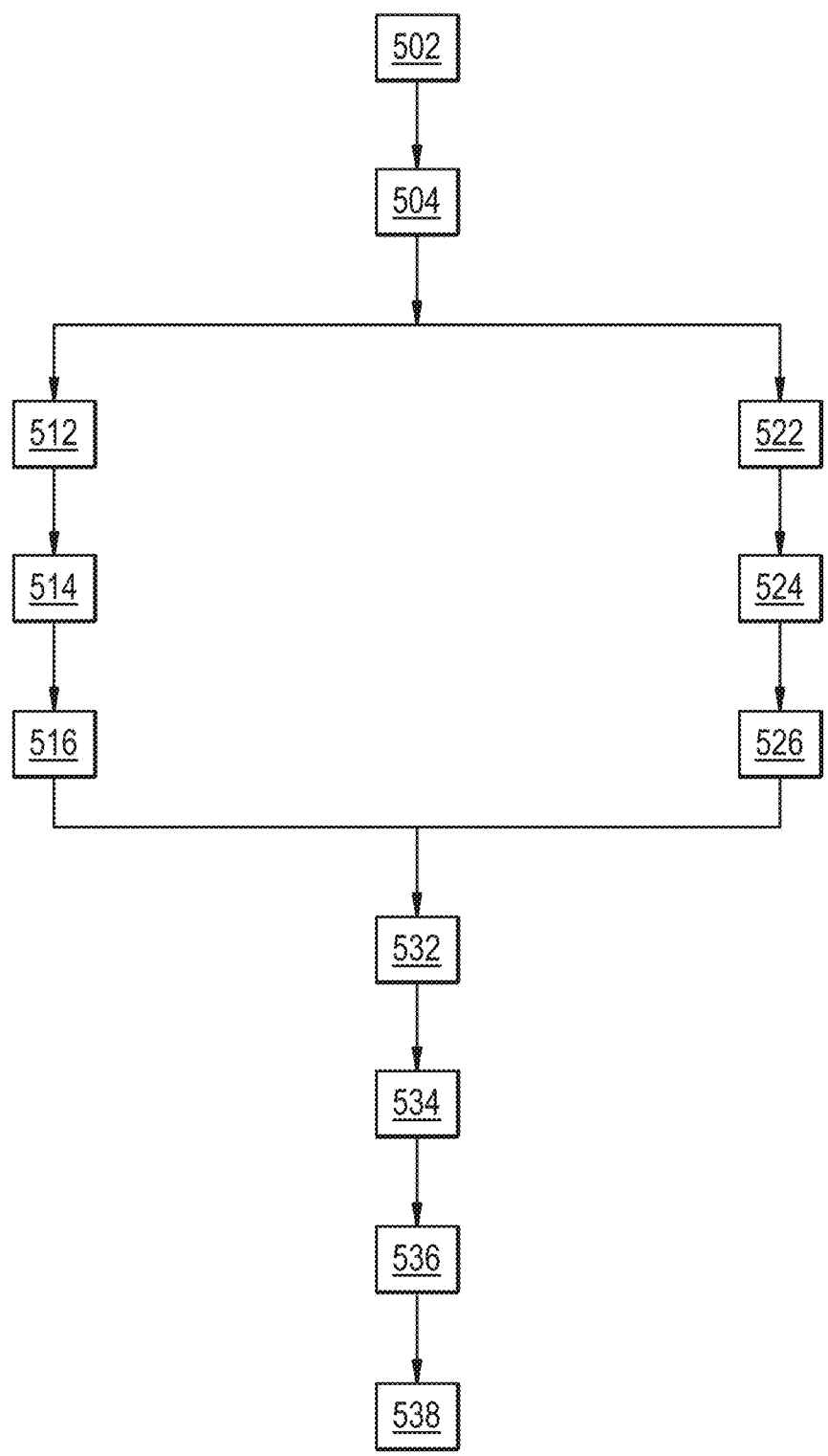
FIG. 5 is a flowchart of a method for reconstructing a contact lens according to at least one embodiment of the invention.

FIG. 5 illustrates a flowchart of a method for reconstructing a contact lens according to at least one embodiment. The method begins with generating a light beam having a planar waveform, 502. After generating a light beam having a planar waveform, then splitting the light beam with a beam splitter into two light beams with the first light beam being directed at the measurement assembly and the second light beam being directed at the reference assembly, 504. In at least one embodiment the beam splitter includes at least one of a polarizing beam splitter, a plate beam splitter, or a cube beam splitter. Each of the light beams will travel substantially similar distances prior to being recombined, because in at least one embodiment the path length through the reference assembly is adjusted based on the location of the contact lens being measured and/or the optical characteristics of elements in the first light beam path.

The method continues with targeting the first light beam with at least one diverger lens prior to propagating it through the contact lens to be reflected back, 512. Then reflecting the light beam off the contact, 514. Manipulating the first reflected light beam into a light beam having a planar wavefront, 516. In at least one embodiment, propagating includes sending the first light beam into the measurement assembly and receiving back from the measurement assembly the first reflected light beam.

Occurring substantially at the same time as the first light beam is propagating through the measurement assembly, passing the second light beam through a tank having a fluid, such as saline, in it and an at least partially submerged reference prism, 522. After passing the second light beam through a tank with saline, passing the second light beam through the reference prism and reflecting it, for example, at an air-prism barrier, 524. Then passing the second reflected light beam through the saline tank, 526. In at least one embodiment, propagating includes sending the second light beam into the reference assembly and receiving back from the assembly the second reflected light beam.

Merging the two reflected light beams together to form a combined light beam having information associated with at least one characteristic of the contact lens, 532. In at least one embodiment, the first reflected light beam and the second reflected light beam are propagated to the beam splitter to combine into one light beam. Manipulating the combined light beam through at least one of a relay lens(es), an imaging path spatial filter, and a polarizer to provide an image with an interference pattern, 534. Receiving the manipulated combined light beam in a detector, 536. Processing the image produced by the detector to determine at least one characteristic of the contact lens, 538.

In at least one embodiment, the coherence length of the light beams benefit by traveling the path lengths through dispersive materials to be matched between the test arm and the reference arm of the system to achieve maximum fringe detection. In at least one embodiment, this means matching the path length and dispersion in the test arm and the reference arm of the system. Movement of the contact lens sample in the cuvette will change the saline path, and therefore the depth of submersion of the reference prism in the saline solution is adjusted to account for movement resulting from the saline solution. The motion of the reference prism 162 is coupled through, for example, the controller to the motion of the contact lens to match the coherence path on the measurement surface of the contact lens. The exposed air-glass interface, i.e., the top panel of the reference prism that is not submerged in the saline solution, is the reference surface. As illustrated in FIG. 4, the path length through the saline solution is variable to match the saline path for the contact lens.

After measurement and determination of an optical image from measurement of at least one surface of a contact lens, a thickness profile of the contact lens and an index of refraction, a whole lens model can be reconstructed. The contact lens can be modeled in any manner, such as a physical or virtual model and used to generate performance data. For example, a whole lens reconstruction containing the measurements for both surfaces of a contact lens, thickness of a contact lens, and index of refraction can be used to verify designs treating a number of visual issues, such as myopia, presbyopia, hyperopia, astigmatism, etc. Additionally, the whole lens reconstruction can be depicted or displayed in connection with a computer-implemented device such as a digital display. In at least one embodiment, the reconstruction system model can be used for quality control of contact lens production.

At least one illustrated system and/or method for a whole lens reconstruction has been shown to produce a complete model of a contact lens. Other contact lenses with interesting or unique surface shapes for bifocals or toric lenses can also be measured by this system according to at least one embodiment. This same analysis can be applied to complete reconstructions, in virtually or simulated form for these lenses as well. Additionally, reverse raytracing can also be used to ensure accuracy by calibrating for retrace errors of large surface departures. Reverse raytrace modeling reconstructs surfaces in three dimensions and compensates for the refraction at a surface.

Comparison of simulated data from a whole lens reconstruction with measured data can also be used to verify interferometric testing. A method for verifying the reconstructed lens can be done by calculating the measurements of at least one surface of a contact lens, the thickness profile of the contact lens, and the index of refraction of the contact lens. In the method for verifying and comparing the reconstruction lens the index of refraction is substituted with a uniform index of refraction for a contact lens material.

Figure 6A:
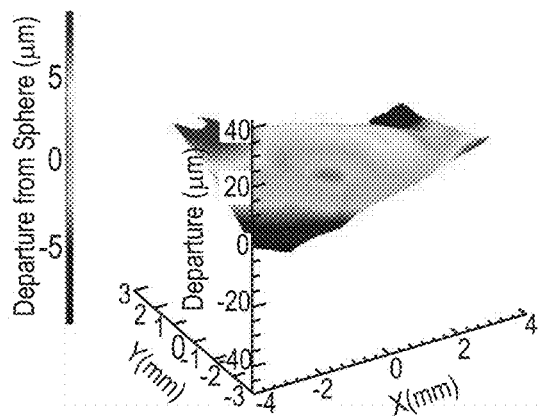
FIGS. 6A and 6B show measurements of the surface figure of the two surfaces of a contact lens with the plots being relative to a base spherical surface indicated for each plot. The scale of the plots is in microns.
Figure 6B:
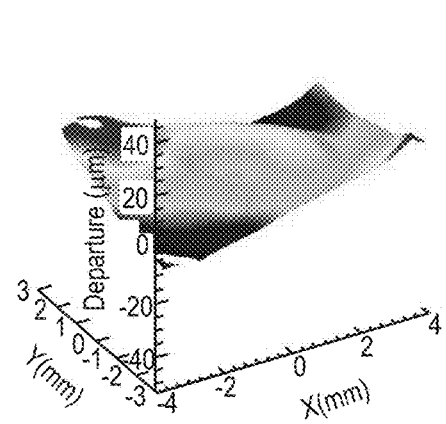

A system built according to at least one embodiment was used to demonstrate the system performance and capabilities by measuring a galyfilcon A contact lens. The lens packaging indicated a lens power of −3.00 D. The posterior surface was measured to have an 8.848 mm radius of curvature. The measured surface is depicted in FIG. 6A. The second surface was measured to have a radius of 9.468 mm. The surface has a similar shape to first surface indicating that the features are from lens deformation. The measurement of the second surface covers a larger area than the first surface since the radius is longer. The measured anterior surface is depicted in FIG. 6B.

Figure 7A:
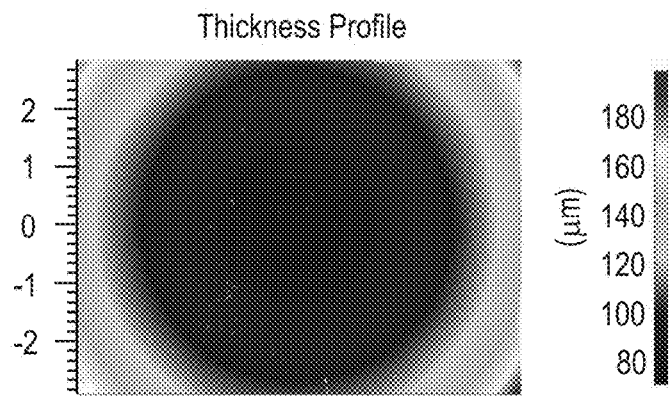
FIGS. 7A and 7B show the thickness profile of the lens as derived from the measurements in FIGS. 6A and 6B with the plot in FIG. 7B showing the thickness with nine Zernike polynomial terms removed. The scale of this plot is nanometers.
Figure 7B:
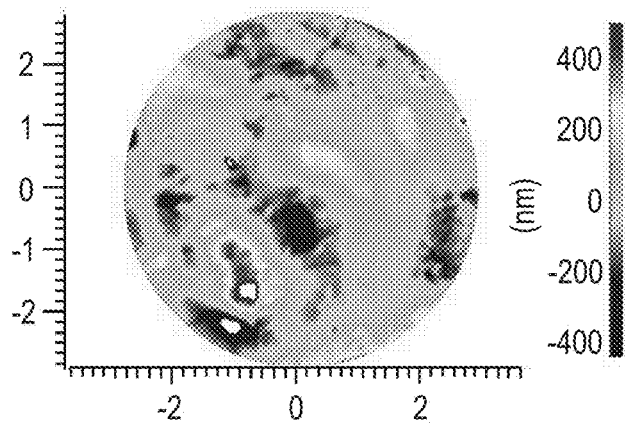

The thickness profile was calculated from these measurements and is shown in FIGS. 7A and 7B. The center thickness is 77 μm and is not centered with the optical axis of the interferometer. The thickness profile of the lens is also shown with nine Zernike polynomial terms removed to highlight the higher spatial frequency features.

The thickness profile and the transmitted wavefront are related by the index of refraction profile of the lens. The thickness profile shown in FIGS. 7A and 7B was used to simulate a transmitted wavefront test by assuming that the index of refraction of the lens material is uniform. The same contact lens was measured in transmission with a Mach-Zehnder interferometer. This wavefront measurement is shown in FIGS. 8A and 8B.

The difference between the simulated transmission wavefront based upon the whole lens reconstruction model and the actual measured transmission test is shown in FIG. 9. Agreement is achieved between these independent measurements of the contact lens wavefront according to the following metrics: a P-V (peak-to-valley) difference of 168 nm and an RMS (root-mean-square) difference of 36.2 nm, or better than $\frac{1}{10}^{th}$ the wavelength of the interferometer system$\square$. The residual differences could be due to a number of factors including a spatial variation of the index not included in the whole lens reconstruction model or induced errors due to the irregularities in contact lens mounting in the low coherence interferometer.

The low-coherence interferometry system built according to at least one embodiment has been demonstrated to produce a complete model of a contact lens. Excellent agreement is found with independent transmission testing. Other contact lenses with interesting surface shapes can be measured by this interferometer such as bifocals and torics. This same analysis can be applied to completely reconstruct these lenses as well.

As will be appreciated by one skilled in the art based on this disclosure, aspects of the present invention may be embodied as a system, method or computer program product. Accordingly, aspects of the present invention may take the form of an entirely hardware embodiment, a processor operating with software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++, C#, Transact-SQL, XML, or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
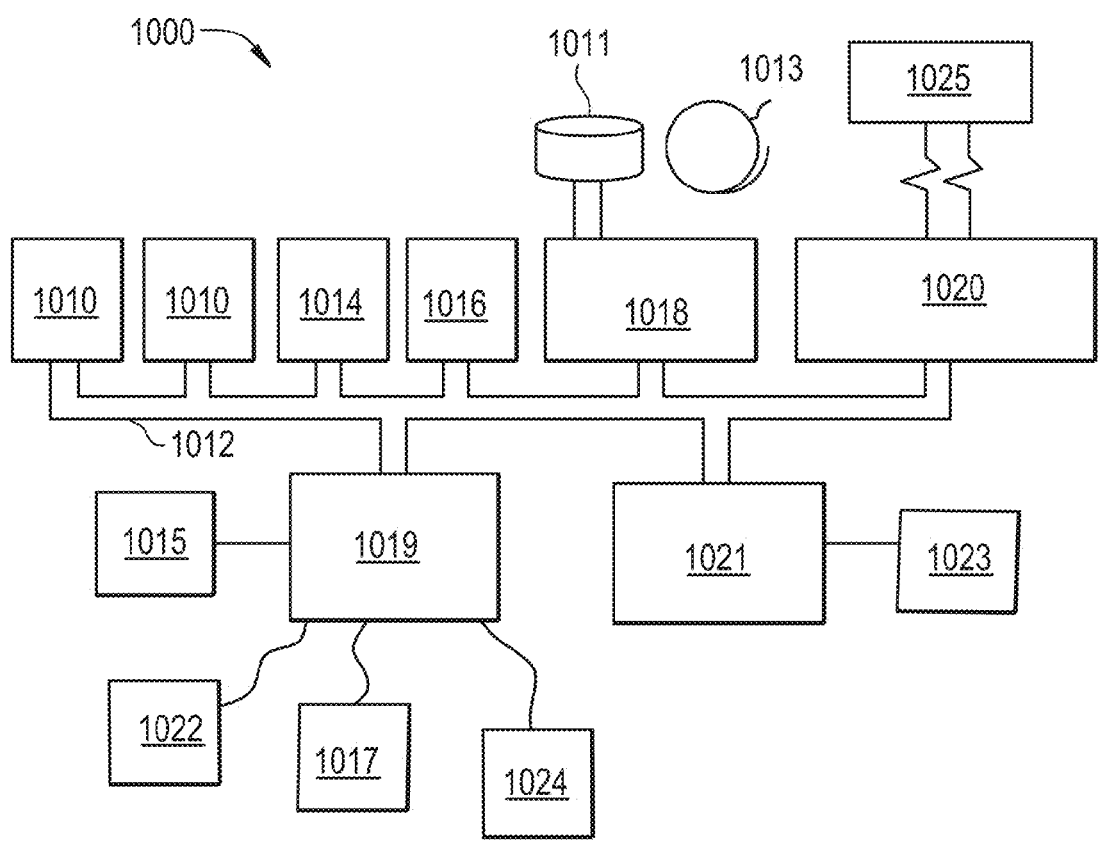
FIG. 10 illustrates a computer program product and computer implementation according to an embodiment of the invention.

Referring now to FIG. 10, a representative hardware environment for practicing at least one embodiment of the invention is depicted. This schematic drawing illustrates a hardware configuration of an information handling/computer system 1000 in accordance with at least one embodiment of the invention. The system 1000 comprises at least one processor or central processing unit (CPU) 1010. The CPUs 1010 are interconnected with system bus 1012 to various devices such as a random access memory (RAM) 1014, read-only memory (ROM) 1016, and an input/output (I/O) adapter 1018. The I/O adapter 1018 can connect to peripheral devices, such as disk units 1011 and tape drives 1013, or other program storage devices that are readable by the system. The system 1000 can read the inventive instructions on the program storage devices and follow these instructions to execute the methodology of at least one embodiment of the invention. The system 1000 further includes a user interface adapter 1019 that connects a keyboard 1015, mouse 1017, speaker 1017, microphone 1024, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Although the present invention has been described in terms of particular example embodiments, it is not limited to those embodiments. The embodiments, examples, and modifications which would still be encompassed by the invention may be made by those skilled in the art, particularly in light of the foregoing teachings.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

What is claimed is:

1. A method for producing a whole lens reconstruction of a contact lens, the method comprising:
    moving at least one contact lens through a series of positions, each position relates to a plurality of contact lens surfaces; and
    adjusting a submersion depth of a reference prism to match a path length for at least one contact lens position,
    for each contact lens position:
        generating a planar low coherence light beam from a light source,
        splitting the generated light beam by a beam splitter into a first light beam and a second light beam,
        propagating the first light beam to a measurement assembly, the measurement assembly directing the first light beam onto a contact lens surface which reflects at least part of the first light beam back to the beam splitter as a first reflected light beam,
        propagating the second light beam to a reference assembly, the reference assembly reflecting at least part of the second light beam to the beam splitter as a second reflected light beam to provide a wavefront reference for measuring the contact lens,
        merging the first reflected light beam and the second reflected light beam by the beam splitter to form a combined light beam, and
        said beam splitter directing the combined light beam to an imaging assembly, the imaging assembly focusing the combined light beam to form an optical image of the contact lens containing an interference pattern;
    correcting at least one optical image for any refractions that are present from one surface of the contact lens that arise during measurement when the light beam passes through the one surface to reach another surface of the contact lens; and
    producing a whole lens reconstruction based on the plurality of optical images of the contact lens, and
    wherein the whole lens reconstruction includes at least one thickness of the contact lens and surface properties of the plurality of surfaces of the contact lens.

2. The method of claim 1, wherein the positions include:
    a confocal measurement position for each surface of the contact lens; and
    a cat's eye measurement position for each surface of the contact lens.

3. The method of claim 2, further comprising calculating the at least one thickness of the contact lens between opposing surfaces of the contact lens.

4. The method of claim 3, further comprising calculating the at least one thickness profile of the contact lens based upon the at least one thickness and the surface properties of the opposing surfaces of the contact lens.

5. The method of claim 4, further comprising calculating a transmitted wavefront map of the contact lens based upon all of the thickness profiles of the contact lens and respective values for an index of refraction of the thickness profiles.

6. The method of claim 1, wherein
    the plurality of surfaces of the contact lens includes a first surface and a second surface; and the positions include: a confocal measurement position for the first surface and the second surface, and a cat's eye measurement position for the first surface and the second surface, and the method further comprising:
calculating the thickness of the contact lens between the first surface and the second surface; and
calculating the thickness profile of the contact lens based upon the thickness and the surface properties of the first surface and the second surface.

7. The method of claim 1, further comprising creating at least one simulated whole lens reconstruction with a processor using calculated measurements of at least one surface of the contact lens and the thickness profile of the contact lens obtained from a separate measurement.

8. The method of claim 1, further comprising creating at least one simulated whole lens reconstruction with a processor using calculated measurements of at least one of
one surface of the at the plurality of contact lens surfaces,
a transmitted wavefront map of the contact lens obtained from a separate measurement, and
an index of refraction of the contact lens.

\* \* \* \* \*